United States Patent
Kim et al.

(10) Patent No.: US 7,582,823 B2
(45) Date of Patent: Sep. 1, 2009

(54) METHOD AND APPARATUS FOR CLASSIFYING MOOD OF MUSIC AT HIGH SPEED

(75) Inventors: Hyoung Gook Kim, Yongin-si (KR); Ki Wan Eom, Seoul (KR); Ji Yeun Kim, Seoul (KR); Yuan Yuan Shi, Beijing (CN); Xuan Zhu, Beijing (CN)

(73) Assignee: Samsung Electronics Co., Ltd., Suwon-Si (KR)

( * ) Notice: Subject to any disclaimer, the term of this patent is extended or adjusted under 35 U.S.C. 154(b) by 130 days.

(21) Appl. No.: 11/519,028

(22) Filed: Sep. 12, 2006

(65) Prior Publication Data

US 2007/0107584 A1    May 17, 2007

(30) Foreign Application Priority Data

Nov. 11, 2005    (KR)    ...................... 10-2005-0107957

(51) Int. Cl.
*G10H 1/00*    (2006.01)
(52) U.S. Cl. .............................. 84/600; 84/601; 84/602; 700/94
(58) Field of Classification Search ........... 84/600–602; 700/94
See application file for complete search history.

(56) References Cited

U.S. PATENT DOCUMENTS

| | | | | |
|---|---|---|---|---|
| 5,616,876 | A * | 4/1997 | Cluts ............................ | 84/609 |
| 6,201,176 | B1 * | 3/2001 | Yourlo ......................... | 84/609 |
| 6,545,209 | B1 * | 4/2003 | Flannery et al. ............... | 84/609 |
| 6,657,117 | B2 * | 12/2003 | Weare et al. ................... | 84/668 |
| 6,813,600 | B1 * | 11/2004 | Casey et al. .............. | 704/200.1 |
| 6,964,023 | B2 * | 11/2005 | Maes et al. .................. | 715/811 |
| 6,987,221 | B2 * | 1/2006 | Platt ............................. | 84/601 |
| 7,022,905 | B1 * | 4/2006 | Hinman et al. ................ | 84/609 |
| 7,022,907 | B2 * | 4/2006 | Lu et al. ....................... | 84/611 |
| 7,024,424 | B1 * | 4/2006 | Platt et al. .................... | 707/102 |
| 7,031,980 | B2 * | 4/2006 | Logan et al. ............. | 707/104.1 |
| 7,091,409 | B2 * | 8/2006 | Li et al. ........................ | 84/634 |
| 7,102,067 | B2 * | 9/2006 | Gang et al. ................... | 84/600 |
| 7,115,808 | B2 * | 10/2006 | Lu et al. ....................... | 84/611 |
| 7,203,558 | B2 * | 4/2007 | Sugiyama et al. ............. | 700/94 |
| 7,227,071 | B2 * | 6/2007 | Tagawa et al. ................ | 84/601 |
| 7,279,629 | B2 * | 10/2007 | Hinman et al. ................ | 84/615 |
| 7,302,451 | B2 * | 11/2007 | Radhakrishnan et al. . | 707/104.1 |
| 7,312,391 | B2 * | 12/2007 | Kaiser et al. .................. | 84/615 |
| 7,326,848 | B2 * | 2/2008 | Weare et al. .................. | 84/668 |

(Continued)

FOREIGN PATENT DOCUMENTS

JP    2004-326113    11/2004

OTHER PUBLICATIONS

Korean Office Action dated Nov. 8, 2006, issued in corresponding Korean Patent Application No. 10-2005-0107957.

*Primary Examiner*—David S. Warren
(74) *Attorney, Agent, or Firm*—Staas & Halsey LLP

(57) ABSTRACT

A method and apparatus for classifying mood of music at high speed. The method includes: extracting a Modified Discrete Cosine Transformation-based timbre feature from a compressed domain of a music file; extracting a Modified Discrete Cosine Transformation-based tempo feature from the compressed domain of the music file; and classifying the mood of the music file based on the extracted timbre feature and the extracted tempo feature.

13 Claims, 7 Drawing Sheets

| MUSIC | MOOD CLASSIFICATION RELIABILITY |
|---|---|
| MUSIC 1 | 100% |
| MUSIC 2 | 98% |
| ⋮ | ⋮ |
| MUSIC N | 79% |

U.S. PATENT DOCUMENTS

| | | | |
|---|---|---|---|
| 7,371,958 B2* | 5/2008 | Kim et al. | 84/609 |
| 2002/0019858 A1* | 2/2002 | Kaiser et al. | 709/219 |
| 2002/0178012 A1* | 11/2002 | Wang et al. | 704/503 |
| 2002/0181711 A1* | 12/2002 | Logan et al. | 381/1 |
| 2003/0004711 A1* | 1/2003 | Koishida et al. | 704/223 |
| 2003/0135513 A1* | 7/2003 | Quinn et al. | 707/102 |
| 2003/0221541 A1* | 12/2003 | Platt | 84/609 |
| 2004/0060426 A1* | 4/2004 | Weare et al. | 84/668 |
| 2004/0194612 A1* | 10/2004 | Parees | 84/609 |
| 2004/0231498 A1* | 11/2004 | Li et al. | 84/634 |
| 2004/0237759 A1* | 12/2004 | Bill | 84/668 |
| 2005/0038819 A1* | 2/2005 | Hicken et al. | 707/104.1 |
| 2005/0091062 A1* | 4/2005 | Burges et al. | 704/273 |
| 2005/0091066 A1* | 4/2005 | Singhal | 704/500 |
| 2005/0092165 A1* | 5/2005 | Weare et al. | 84/668 |
| 2005/0096898 A1* | 5/2005 | Singhal | 704/205 |
| 2005/0109194 A1* | 5/2005 | Gayama | 84/613 |
| 2005/0120868 A1* | 6/2005 | Hinman et al. | 84/615 |
| 2005/0129251 A1* | 6/2005 | Schulz | 381/56 |
| 2005/0165779 A1* | 7/2005 | Kaiser et al. | 707/6 |
| 2005/0211071 A1* | 9/2005 | Lu et al. | 84/611 |
| 2005/0251532 A1* | 11/2005 | Radhakrishnan et al. | 707/104.1 |
| 2006/0032363 A1* | 2/2006 | Platt | 84/601 |
| 2006/0054007 A1* | 3/2006 | Lu et al. | 84/611 |
| 2006/0065104 A1* | 3/2006 | Ball | 84/609 |
| 2006/0096447 A1* | 5/2006 | Weare et al. | 84/616 |
| 2006/0107823 A1* | 5/2006 | Platt et al. | 84/616 |
| 2007/0107584 A1* | 5/2007 | Kim et al. | 84/612 |
| 2007/0113724 A1* | 5/2007 | Kim et al. | 84/609 |
| 2007/0131095 A1* | 6/2007 | Park et al. | 84/609 |
| 2007/0131096 A1* | 6/2007 | Lu et al. | 84/611 |
| 2007/0169613 A1* | 7/2007 | Kim et al. | 84/609 |
| 2007/0174274 A1* | 7/2007 | Kim et al. | 707/5 |
| 2008/0022844 A1* | 1/2008 | Poliner et al. | 84/609 |

* cited by examiner

FIG. 6

| MUSIC | MOOD CLASSIFICATION RELIABILITY |
|---|---|
| MUSIC 1 | 100% |
| MUSIC 2 | 98% |
| ⋮ | ⋮ |
| MUSIC N | 79% |

FIG. 7

MUSIC 1
MUSIC 2
⋮
MUSIC N

METHOD AND APPARATUS FOR CLASSIFYING MOOD OF MUSIC AT HIGH SPEED

CROSS-REFERENCE TO RELATED APPLICATION

This application claims the benefit of Korean Patent Application No. 10-2005-107957, filed on Nov. 11, 2005, in the Korean Intellectual Property Office, the disclosure of which is incorporated herein by reference.

BACKGROUND OF THE INVENTION

1. Field of the Invention

The present invention relates to a method and apparatus for classifying a mood of music at high speed, and more particularly, to a method and apparatus for extracting a Modified Discrete Cosine Transformation (MDCT)-based timbre feature and tempo feature from a compressed domain of a music file and classifying the mood of the music file based on the extracted timbre feature and the extracted tempo feature.

2. Description of Related Art

In conventional methods of automatically detecting the mood of music, timbre features such as a spectral shape feature, a spectral contrast feature and a rhythm feature such as an intensity feature, average strength, average regularity, and average tempo are extracted from and used for classifying the mood of a music file. Also, in some of the conventional methods of automatically detecting the mood of the music, the mood is classified into four different moods by a hierarchical structure using Gaussian Mixture Model (GMM). However, in the conventional method of automatically detecting the mood of the music, since features of the music have to be extracted from a decompressed domain in which an encoded music file is decoded, extraction is low and, as a result, detection is slowed. Also, in some of the conventional method of automatically detecting the mood of the music, the mood of the music is classified by modeling a mood class that is simply defined and regardless of genres, thereby generating many classification errors.

Conversely, in a conventional music recommendation system, high-capacity music files stored in a hard disk driver (HDD) are classified according to a taste of a user. Specifically, in the conventional music recommendation system, for example, 249 tunes are stored, 10 tunes are presented for each mood designated by the user, and the user performs feedback as fit/unfit for each tune, thereby performing a selection of music for each mood classified into bright, exciting, quiet, sad, and healing. However, in this conventional music recommendation system, extraction speeds are slow because features of the music have to be extracted from a decompressed domain in which an encoded music file is decoded. Also, a difficulty in the conventional music recommendation system is that feedback needs to be performed more than 18 times so that tunes desired by the user can be selected at an 85% selection rate.

As described above, in the conventional music mood classification methods, slow extraction speeds exist because a decoding process of converting an encoded music file such as MP3 into PCM data is required in order to extract the features of the music file, such as timbre, tempo, and intensity from a decompressed domain.

Also, in the conventional music mood classification method, a many classification errors are generated, caused by mood classes defined regardless of genres.

In addition, in the conventional music mood classification method and apparatus, a method of displaying a result of classifying a plurality of music files is overlooked. Specifically, in the conventional music mood classification method and apparatus, for example, when 1,000 tunes are classified in moods, an exciting tune is selected because a user wants to hear the exciting tune, and exciting tunes are played in the same order every time, thereby making the user perceive the apparatus is unsophisticated.

Accordingly, as a method of solving the perception of the apparatus is unsophisticated, a method of enabling an arrangement order to be random and a music mood classification method of arranging music files in an order of high reliability of classification such that the reliability of the apparatus, specifically, a result of mood classification, is recognized to be high.

BRIEF SUMMARY

An aspect of the present invention provides a method and apparatus for classifying music mood by extracting a timbre feature and a tempo feature of a music file in a compressed domain.

An aspect of the present invention also provides a method and apparatus for more precisely classifying music mood by first subdividing music categories and then reclassifying a high-uncertainty category.

An aspect of the present invention also provides a method and apparatus for displaying a music mood classification result in an order of music of high mood classification reliability, thereby enabling a user to rely on the music mood classification.

According to an aspect of the present invention, there is provided a method of classifying a mood of a music file, including: extracting a Modified Discrete Cosine Transformation (MDCT)-based timbre feature from a compressed domain of a music file; extracting an MDCT-based tempo feature from the compressed domain of the music file; and classifying mood of the music file based on the extracted timbre feature and the extracted tempo feature.

According to another aspect of the present invention, there is provided an apparatus for classifying mood of music at high speed, including: a timbre extraction unit extracting an MDCT-based timbre feature from a compressed domain of a music file; a tempo extraction unit extracting an MDCT-based tempo feature from the compressed domain of the music file; and a mood classification unit classifying the mood of the music file based on the extracted timbre feature and the extracted tempo feature.

According to another aspect of the present invention, there is provided a method of improving a reliability of music mood classification, including: extracting Modified Cosine Transformation-based timbre and tempo features from a compressed portion of a music file; and classifying a mood of the music file by classifying a genre of the music file based on the extracted timbre feature, ascertaining whether the genre resulting from the genre classification has an uncertainty in excess of a threshold amount, and reclassifying a category of the music file of the genre when the uncertainty of the genre classification exceeds the threshold amount.

According to other aspects of the present invention, there are provided computer readable recording media in which programs for executing the aforementioned methods are recorded.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 6 is a diagram illustrating mood classification reliability in the high-speed music mood classification method; and FIG. 7 is a diagram illustrating an example of displaying a music file on a playlist in the high-speed music mood classification method.

DETAILED DESCRIPTION OF EMBODIMENTS

Figure 1:
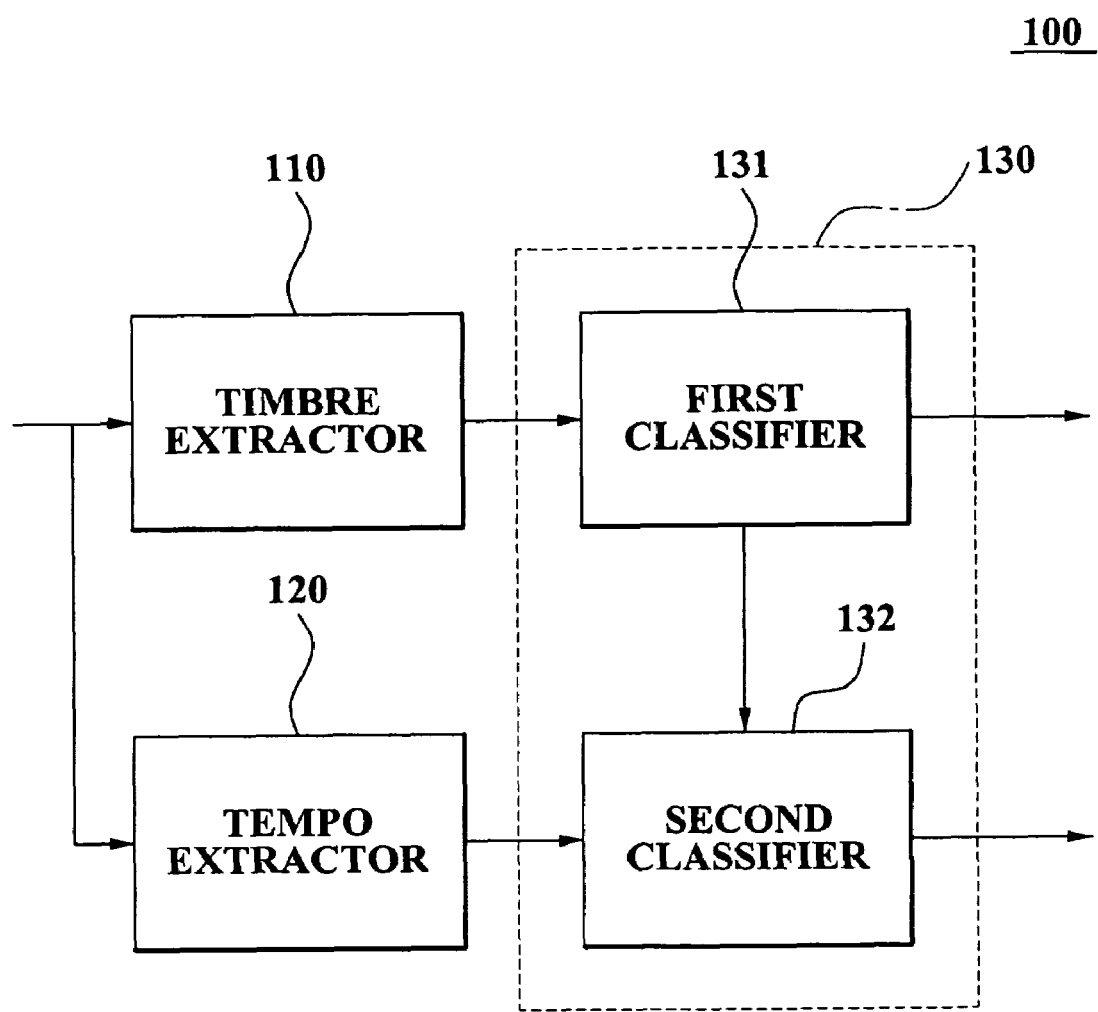
FIG. 1 is a configuration diagram illustrating a high-speed music mood classification apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a configuration diagram illustrating a high-speed music mood classification apparatus 100 according to an embodiment of the present invention.

Referring to FIG. 1, the high-speed music mood classification apparatus 100 includes a timbre extractor 110, a tempo extractor 120, and a mood classifier 130.

The timbre extractor 110 extracts a Modified Discrete Cosine Transformation (MDCT)-based timbre feature. Specifically, the timbre extractor 110 may extract MDCT coefficients by decoding a part of the music file encoded by, for example, an MPEG Audio Layer-3 (MP3) method, may select predetermined MDCT coefficients from the extracted MDCT coefficients, and may extract the timbre feature from the selected MDCT coefficients.

The tempo extractor 120 extracts an MDCT-based tempo feature from a compressed domain of the music file. Specifically, the tempo extractor 120 may extract MDCT coefficients by decoding a part of the music file encoded by the MP3 method, may select predetermined MDCT coefficients from the extracted MDCT coefficients, may extract an MDCT modulation spectrum (MS) from the selected MDCT coefficients by performing Discrete Fourier Transformation (DFT), may divide a sub-band of the extracted MDCT MS, and may extract energy from the divided sub-band to use the tempo feature of the music file.

As described above, it is to be appreciated that since the high-speed music mood classification apparatus 100 extracts the timbre feature and the tempo feature from the compressed domain of the music file, a processing speed is faster than extracting features from a decompressed domain.

The mood classifier 130 classifies the mood of the music file based on the extracted timbre feature and the extracted tempo feature. Specifically, the mood classifier 130 may classify the mood of the music file into, for example, any one of calm, sad, pleasant, and exciting, based on the extracted timbre feature and the extracted tempo feature The mood classifier 130 includes a first classifier 131 and a second classifier 132. The first classifier 130 classifies the mood of the music file according to music genre in order to improve mood classification performance of the music file.

The first classifier 131 classifies a genre of the music file based on the extracted timbre feature. Specifically, the first classifier 131 may first classify the genre of the music into any one of sad 203, calm in classic 201, calm in pop 202, exciting 204, pleasant in pop 205, pleasant in classic 206, and pleasant in jazz 207, as shown in FIG. 2.

Figure 2:
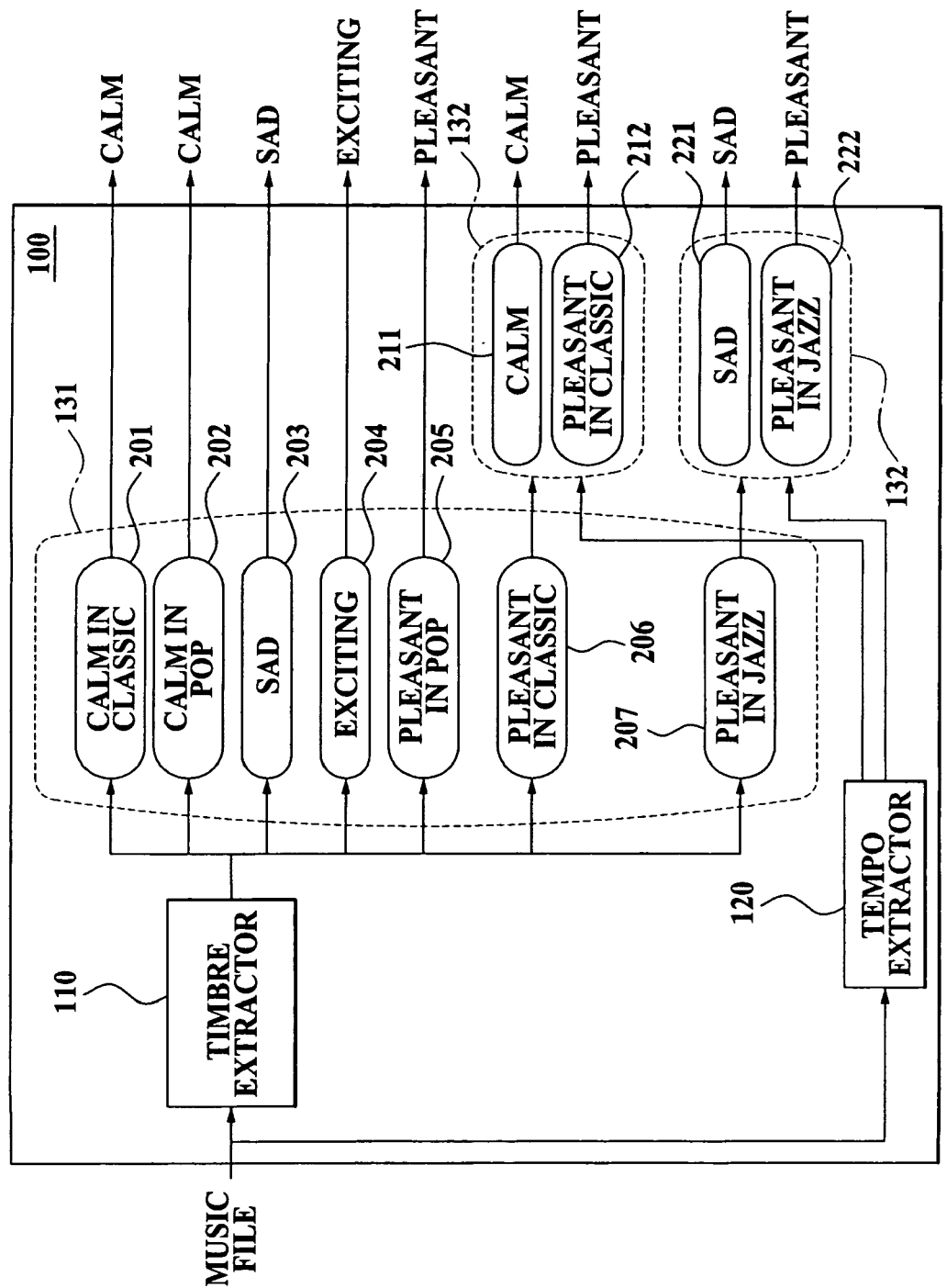
FIG. 2 is a diagram illustrating an example of mood of music in the high-speed music mood classification apparatus.

As shown in FIG. 2, when the timbre feature of the music file is calm, the first classifier 131 classifies the genre of the music file into calm in classic 201 and calm in pop 202, and when the timbre feature of the music file is sad 203 and exciting 204, the music file may be classified as is. Also, when the timbre feature of the music file is pleasant, the first classifier 131 may form a model according to pleasant in pop 205, pleasant in classic 206, and pleasant in jazz 207 and may first classify the mood by the model.

When the genre of the music file is calm in classic 201 or calm in pop 202, the first classifier 131 may classify the mood of the music file into the calm.

Also, when the genre of the music file is sad 203, the first classifier 131 may classify the mood of the music file into sad, and when the genre of the music file is exciting 204, the first classifier 131 may classify the mood of the music file into exciting.

Also, when the genre of the music file is pleasant in pop 205, the first classifier 131 may classify the mood of the music file into pleasant.

When uncertainty of a result of the genre classification is greater than a predetermined value, the second classifier 132 reclassifies a category of the music file based on the extracted tempo feature.

For example, when the genre classification result is pleasant in classic 206, which is easy to confuse with calm 211, the second classifier 132 may reclassify the category of the music file into calm 211 and pleasant in classic 212.

When the category with respect to the reclassified music file is calm 211, the second classifier 132 may classify the mood of the music file into calm. Also, when the category of the reclassified music file is pleasant in classic 212, the second classifier 132 may classify the mood of the music file into pleasant.

When the genre classification result is pleasant in jazz 207, which is easy to confuse with sad 221, the second classifier 132 may reclassify the category of the music file into sad 221 and pleasant in jazz 222 according to the extracted tempo feature.

When the category with respect to the reclassified music file is sad 221, the second classifier 132 may classify the mood of the music file into sad. Also, when the category with respect to the reclassified music file is pleasant in jazz 222, the second classifier 132 may classify the mood of the music file into pleasant.

The mood classifier 130 may merge the mood categories into four mood classes such as exciting, pleasant, calm, and sad by merging the mood classification result of the music file, first classified by the first classifier 131, and the mood classification result of the music file, and next classified by the second classifier 132.

In the above-described embodiment of the present invention, mood is first classified based on the timbre feature and is next reclassified based on the tempo feature when uncertainty of the first classification is more than a predetermined standard value, thereby improving mood classification performance of the music file.

Figure 7:
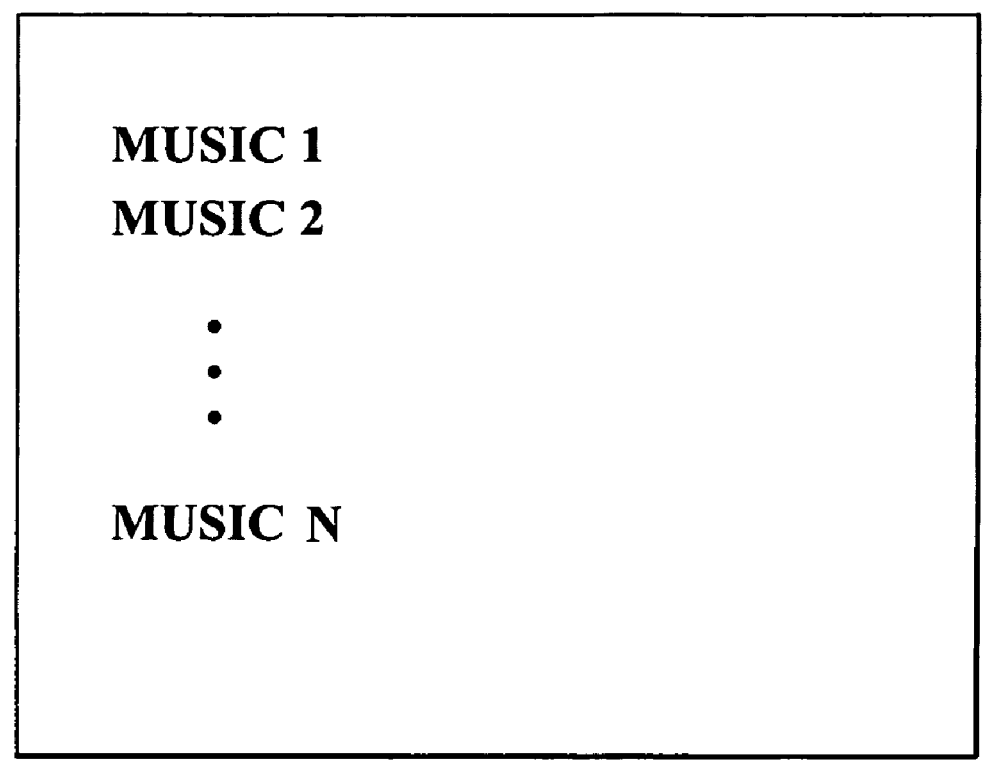

Conversely, the high-speed music mood classification apparatus 100 may further include a display unit (not shown) for displaying the mood classification result of the music file. The display unit may display the classified music file on a playlist in an order of the music file descending from high mood classification reliability, as shown in FIG. 7. According to the above-described embodiment of the present invention, music files are displayed in the order of high mood classification reliability as shown in FIG. 7 by a probability value of being determined to be each mood in classifying the mood of the music file, thereby providing a playlist of high reliability to a user.

Conversely, the high-speed music mood classification apparatus 100 may display the music files in a random order on a playlist with respect to classifying the mood of the music file. According to the above-described embodiment of the present invention, the mood classification result is randomly displayed in order to correct a defect that a user perceives the mood classification result as unsophisticated when the music files are arranged in the same order every time according to the mood classification result, thereby providing more various playlists to the user.

Figure 3:
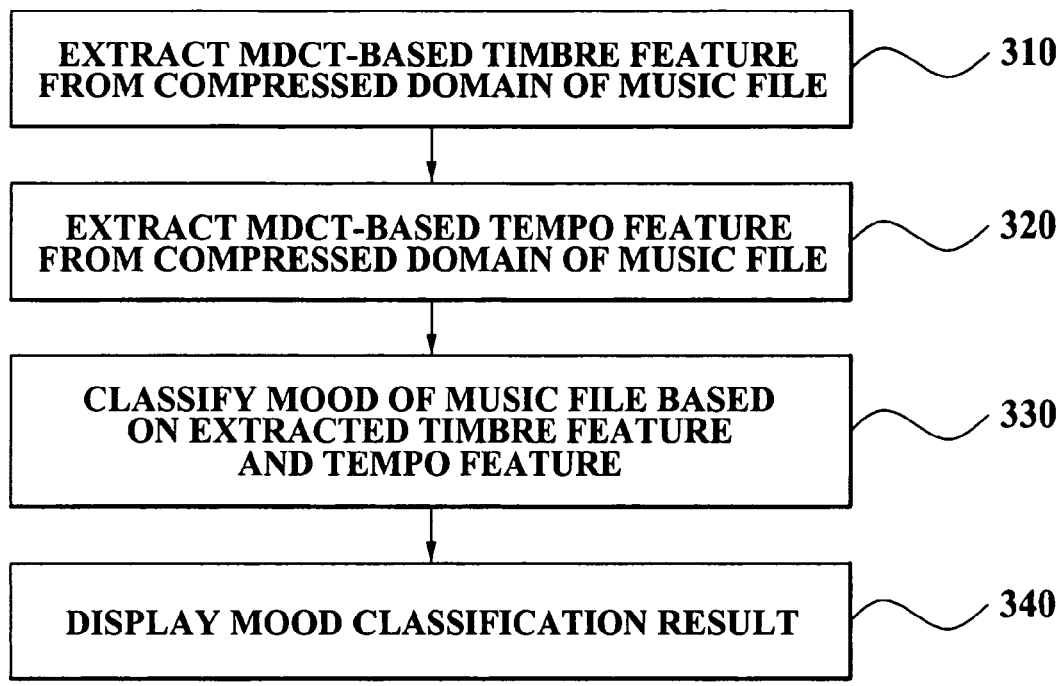
FIG. 3 is a diagram illustrating a high-speed music mood classification method according to an embodiment of the present invention.

FIG. 3 is a diagram illustrating a high-speed music mood classification method according to an embodiment of the present invention.

In operation 310, a high-speed music mood classification apparatus extracts an MDCT-based timbre feature from a compressed domain of a music file. The process of extracting the MDCT-based timbre feature in operation 310 will be described in detail with reference to FIG. 4.

Figure 4:
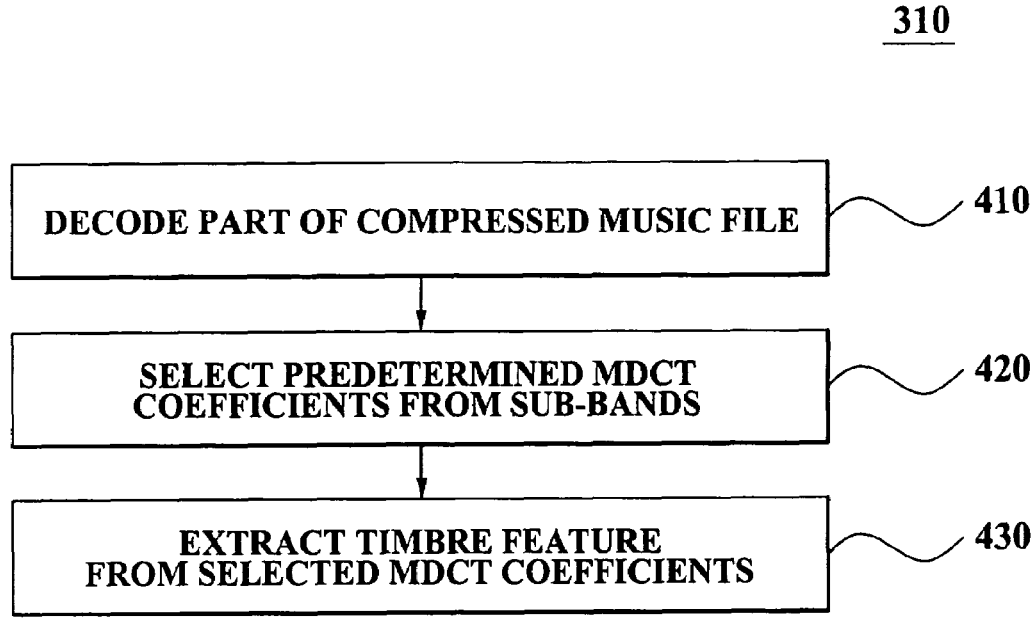
FIG. 4 is a diagram illustrating an example of extracting a timbre feature in the high-speed music mood classification method.

FIG. 4 is a diagram illustrating an example of extracting the timbre feature in the high-speed music mood classification method.

Referring to FIG. 4, in operation 410, the high-speed music mood classification apparatus decodes a part of the music file encoded by a predetermined encoding method and extracts 576 MDCT coefficients $S_i(n)$. In this case, n indicates a frame index of the MDCT, and i (0 to 575) indicates a sub-band index of the MDCT In operation 420, the high-speed music mood classification apparatus selects predetermined MDCT coefficients $S_k(n)$ from 576 MDCT sub-bands. In this case, $S_k(n)$ indicates the selected MDCT coefficients, and k(<i) indicates the selected MDCT sub-band index.

In operation 430, the high-speed music mood classification apparatus extracts 25 timbre features from each of the selected MDCT coefficients. As the extracted timbre features, there are a spectral centroid, a bandwidth, a rolloff, a flux, a spectral sub-band peak, a valley, and an average.

$$C(n) = \frac{\sum_{i=0}^{k-1}(k=1)s_i(n)}{\sum_{i=0}^{k-1}s_i(n)} \quad \text{(Equation 1)}$$

Equation 1 is associated with the spectral centroid.

$$B(n) = \sqrt{\frac{\sum_{i=0}^{k-1}[i+1-C(n)]^2 \times S_i(n)^2}{\sum_{i=0}^{k-1}S_i(n)^2}} \quad \text{(Equation 2)}$$

Equation 2 is associated with the bandwidth.

$$\sum_{i=0}^{R(n)} s_i(n) = 0.95 \cdot \sum_{i=0}^{k-1} s_i(n) \quad \text{(Equation 3)}$$

Equation 3 is associated with the rolloff.

$$F(n) = \sum_{i=0}^{k-1}(s_i(n) - s_i(n-))^2 \quad \text{(Equation 4)}$$

Equation 4 is associated with the flux.

$$B_{peak}(n) = \max_{0 \leq i \leq l-1}[|s_i(n)|] \quad \text{(Equation 5)}$$

Equation 5 is associated with the spectral sub-band peak.

$$B_{valley}(n) = \min_{0 \leq i \leq l-1}[|s_i(n)|] \quad \text{(Equation 6)}$$

Equation 6 is associated with the valley.

$$B_{average}(n) = \frac{1}{l} \cdot \sum_{i=0}^{l-1}|s_i(n)| \quad \text{(Equation 7)}$$

Equation 7 is associated with the average.

Returning to FIG. 3, in operation 320, the high-speed music mood classification apparatus extracts an MDCT-based tempo feature from the compressed domain of the music file. The process of extracting the MDCT-based tempo feature in operation 320 will be described in detail with reference to FIG. 5.

Figure 5:
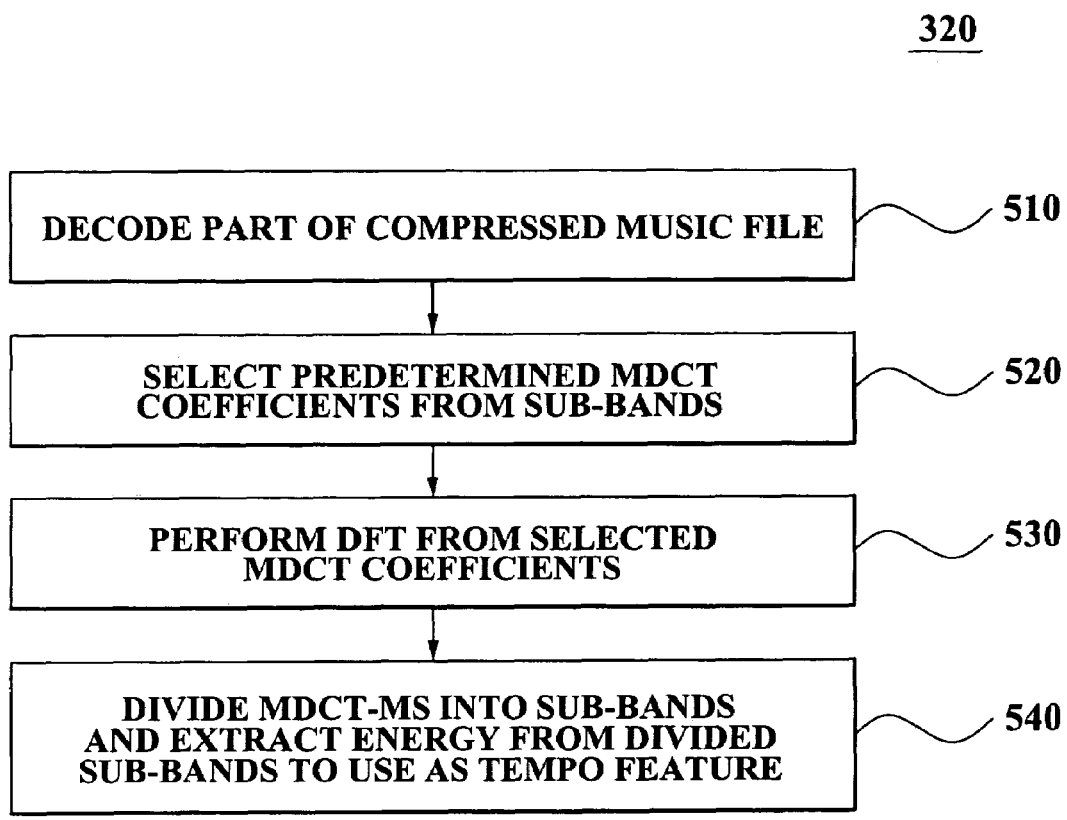
FIG. 5 is a diagram illustrating an example of extracting a tempo feature in the high-speed music mood classification method.

Referring to FIG. 5, in operation 510, the high-speed music mood classification apparatus decodes a part of the music file encoded by a predetermined encoding method and extracts 576 MDCT coefficients $S_i(n)$. In this case, n indicates a frame index of the MDCT, and i (0 to 575) indicates a sub-band index of the MDCT.

In operation 520, the high-speed music mood classification apparatus selects MDCT coefficients $S_k(n)$ which are strong against noise, from the 576 MDCT sub-bands. In this case, $S_k(n)$ indicates the selected MDCT coefficients, and k(<i) indicates the selected MDCT sub-band index.

In operation 530, the high-speed music mood classification apparatus extracts an MDCT MS by performing a DFT from the selected MDCT coefficients.

$$X_k(n) = s_k(n) \quad \text{(Equation 8)}$$

$$Y_k(q) = \sum_{n=0}^{N-1} X_k(n) e^{-j\frac{2\pi}{N}nq} \quad \text{(Equation 9)}$$

In this case, q indicates a modulation frequency, and modulation resolution depends on a DFT length N.

The MDCT MS on which DFT is performed by using time shift may be shown in a four-dimensional form having three variables, as Equation 10.

$$Y_{t,k}(q) = \sum_{n=0}^{N-1} X_k(t+n) e^{-j\frac{2\pi}{N}nq} \quad \text{(Equation 10)}$$

In this case, t indicates a time index, a shift of MDCT-MS in time.

In operation 540, the high-speed music mood classification apparatus divides the extracted MDCT MS into N sub-bands and extracts energy from the divided sub-bands to use as an MDCT-MS-based tempo feature.

Returning to FIG. 3, in operation 330, the high-speed music mood classification apparatus classifies the mood of the music file based on the extracted timbre feature and the extracted tempo feature.

In operation 330, the high-speed music mood classification apparatus may classify a genre of the music file based on the extracted timbre feature and may reclassify a category of the music file of the genre when uncertainty of the genre classification result is more than a predetermined standard value.

Specifically, in operation 330, when the uncertainty of the genre classification result is more than the predetermined standard value, the high-speed music mood classification apparatus may reclassify the category of the music file of the genre.

In operation 330, the high-speed music mood classification apparatus may first classify music files into any one of seven classes such as sad, exciting, calm in classic, calm in pop, pleasant in pop, pleasant in classic, and pleasant in jazz, based on the extracted timbre feature. The high-speed music mood classification apparatus may then reclassify with respect to the class whose first mood classification result is easy to confuse, such as the pleasant in classic and the pleasant in jazz, based on the extracted tempo feature.

Specifically, in operation 330, the high-speed music mood classification apparatus may reclassify the category of the music file classified into the pleasant in classic into the calm and the pleasant in classic according to the extracted tempo feature and may reclassify the category of the music file classified into the pleasant in classic into the sad and the pleasant in classic according to the extracted tempo feature.

Also, in operation 330, the high-speed music mood classification apparatus merges the categories of the reclassified music file into K moods. Specifically, the high-speed music mood classification apparatus may merge the categories into four mood classes such as exciting, pleasant, calm, and sad by merging the mood classification result first classified according to the extracted timbre feature and the mood classification result subsequently classified according to the extracted tempo feature.

Conversely, the high-speed music mood classification apparatus may classify the music file into a subdivided category by a Gaussian Mixture Model (GMM).

In operation 330, the high-speed music mood classification apparatus may classify the mood of the music file into any one of sad, calm, exciting, and pleasant, based on the extracted timbre feature and the extracted tempo feature.

In operation 340, the high-speed music mood classification apparatus displays the classified mood classification result.

In this case, in operation 340, the high-speed music mood classification apparatus may display the classified music file according to mood classification reliability of the music file. Specifically, in operation 340, the high-speed music mood classification apparatus may arrange the classified music file in an order descending from a high mood classification reliability of the music file as shown in FIG. 6 and may display the classified music file on a playlist according to the arrange order, as shown in FIG. 7. In this case, a maximum likelihood value of the result of GMM may be used as the mood classification reliability.

In the above-described embodiments of the present invention, the music mood classification result is displayed in the order of music whose mood classification reliability is high, thereby improving music mood classification reliability of a user.

Also, the high-speed music mood classification method of the present invention may be stored on a computer readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts. Examples of the computer readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level languages codes that may be executed by the computer using an interpreter.

According to the above-described embodiments of the present invention, there are provided a method and apparatus for classifying music mood by extracting a timbre feature and a tempo feature of a music file in a compressed domain.

According to the above-described embodiments of the present invention, there are also provided a method and apparatus for more precisely classifying music mood by first subdividing music categories and then reclassifying a high-uncertainty category.

According to the above-described embodiments of the present invention, there are also provided a method and apparatus for displaying a music mood classification result of music files in an order of high mood classification reliability, thereby enabling a user to rely on the music mood classification.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of classifying a mood of a music file, comprising:

extracting a Modified Discrete Cosine Transformation-based timbre feature from a compressed domain of a music file;

extracting a Modified Discrete Cosine Transformation-based tempo feature from the compressed domain of the music file; and classifying a mood of the music file based on the extracted timbre feature and the extracted tempo feature, wherein the extracting the Modified Discrete Cosine Transformation-based timbre feature from the compressed domain of the music file comprises:

extracting Modified Discrete Cosine Transformation coefficients by decoding a part of the music file;

selecting the Modified Discrete Cosine Transformation coefficients of a predetermined number of sub-bands from the extracted Modified Discrete Cosine Transformation coefficients; and extracting a spectral centroid, a bandwidth, a rolloff, and a flux from the selected Modified Discrete Cosine Transformation coefficients, wherein the classifying the mood of the music file comprises:

classifying a genre of the music file based on the extracted timbre feature; and reclassifying a category of the music file of the genre when uncertainty of a genre classification result is greater than a predetermined value; and wherein, in the reclassifying a category of the music file of the genre, the category of the music file of the genre is reclassified based on the extracted tempo feature.

2. The method of claim 1, further comprising merging reclassified categories of the music file into K music moods.

3. The method of claim 1, further comprising displaying a result of the classifying according to mood classification reliability.

4. The method of claim 3, wherein the mood classification reliability is based on a maximum likelihood value of results of a Gaussian Mixture Model, and the displaying comprises:

arranging the classified music file in an order descending from high mood classification reliability of the music file; and displaying the classified music file in a playlist according to the order.

5. The method of claim 1, wherein the extracting the Modified Discrete Cosine Transformation-based tempo feature from the compressed domain of the music file comprises:

extracting the Modified Discrete Cosine Transformation coefficients by decoding a part of the music file;

selecting the Modified Discrete Cosine Transformation coefficients of a predetermined number of sub-bands from the extracted Modified Discrete Cosine Transformation coefficients;

extracting a Modified Discrete Cosine Transformation modulation spectrum from the selected Modified Discrete Cosine Transformation coefficients by performing Discrete Fourier Transformation;

dividing the extracted Modified Discrete Cosine Transformation modulation spectrum into N sub-bands; and extracting a sub-band peak, a sub-band valley, and a sub-band average from the divided sub-band.

6. The method of claim 1, wherein, in the classifying the mood of the music file, the music file is classified into a subdivided category by a Gaussian Mixture Model.

7. The method of claim 1, wherein, in the classifying the mood of the music file, the mood of the music file is classified into one of sad, calm, exciting, and pleasant.

8. A method of classifying a mood of a music file, comprising:

extracting a Modified Discrete Cosine Transformation-based timbre feature from a compressed domain of a music file;

extracting a Modified Discrete Cosine Transformation-based tempo feature from the compressed domain of the music file; and classifying a mood of the music file based on the extracted timbre feature and the extracted tempo feature, wherein the extracting the Modified Discrete Cosine Transformation-based timbre feature from the compressed domain of the music file comprises:

extracting Modified Discrete Cosine Transformation coefficients by decoding a part of the music file;

selecting the Modified Discrete Cosine Transformation coefficients of a predetermined number of sub-bands from the extracted Modified Discrete Cosine Transformation coefficients; and extracting a spectral centroid, a bandwidth, a rolloff, and a flux from the selected Modified Discrete Cosine Transformation coefficients, wherein the classifying the mood of the music file comprises:

classifying a genre of the music file based on the extracted timbre feature; and reclassifying a category of the music file of the genre based on the extracted tempo feature when uncertainty of a genre classification result is greater than a predetermined value;

wherein, in the classifying a genre of the music file, the genre of the music file is classified into one of a sad, an exciting, a calm in classic, a calm in pop, a pleasant in pop, a pleasant in classic, and a pleasant in jazz genre, and wherein, in the reclassifying a category of the music file of the genre, the category of the music file classified into the pleasant in classic genre is reclassified into the calm and the pleasant in classic genres according to the extracted tempo feature, and the category of the music file classified into the pleasant in jazz genre is reclassified into the sad and the pleasant in jazz genres according to the extracted tempo feature.

9. A computer readable recording medium in which a program for executing the method of claim 1 is recorded.

10. An apparatus for classifying a mood of a music file, comprising:

a timbre extraction unit to extract a Modified Discrete Cosine Transformation-based timbre feature from a compressed domain of a music file;

a tempo extraction unit to extract a Modified Discrete Cosine Transformation-based tempo feature from the compressed domain of the music file; and a mood classification unit to classify the mood of the music file based on the extracted timbre feature and the extracted tempo feature, wherein the timbre extraction unit extracts the Modified Discrete Cosine Transformation-based timbre feature from the compressed domain of the music file by extracting Modified Discrete Cosine Transformation coefficients by decoding a part of the music file; selecting the Modified Discrete Cosine Transformation coefficients of a predetermined number of sub-bands from the extracted Modified Discrete Cosine Transformation coefficients; and extracting a spectral centroid, a bandwidth, a rolloff, and a flux from the selected Modified Discrete Cosine Transformation coefficients, and wherein the mood classification unit comprises:

a first classification unit classifying a genre of the music file based on the extracted timbre feature; and a second classification unit reclassifying a category of the music file based on the extracted tempo feature when uncertainty of a genre classification result is greater than a predetermined value.

11. The apparatus of claim 10, further comprising a display unit displaying a result of the classifying of the mood of the music file in an order according to mood classification reliability.

12. A method of improving a reliability of music mood classification, comprising:

extracting Modified Discrete Cosine Transformation-based timbre and tempo features from a compressed portion of a music file; and classifying a mood of the music file by classifying a genre of the music file based on the extracted timbre feature, ascertaining whether the genre resulting from the genre classification has an uncertainty in excess of a threshold amount, and reclassifying a category of the music file of the genre when the uncertainty of the genre classification exceeds the threshold amount, wherein the extracting the Modified Discrete Cosine Transformation-based timbre feature from the compressed domain of the music file comprises:

extracting Modified Discrete Cosine Transformation coefficients by decoding a part of the music file;

selecting the Modified Discrete Cosine Transformation coefficients of a predetermined number of sub-bands from the extracted Modified Discrete Cosine Transformation coefficients; and extracting a spectral centroid, a bandwidth, a rolloff, and a flux from the selected Modified Discrete Cosine Transformation coefficients, and wherein, in the reclassifying a category of the music file of the genre, the category of the music file of the genre is reclassified based on the extracted tempo feature when the genre classification exceeds the threshold amount.

13. A computer readable recording medium in which a program for executing the method of claim 12 is recorded.

* * * * *